(12) United States Patent
Saito et al.

(10) Patent No.: US 10,604,093 B2
(45) Date of Patent: Mar. 31, 2020

(54) VEHICLE FRONT STRUCTURE

(71) Applicant: TOYOTA JIDOSHA KABUSHIKI KAISHA, Toyota-shi (JP)

(72) Inventors: Naohiro Saito, Toyota (JP); Junichi Takayanagi, Nagoya (JP); Ryoichi Hayashi, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/055,351

(22) Filed: Aug. 6, 2018

(65) Prior Publication Data

US 2019/0084511 A1    Mar. 21, 2019

(30) Foreign Application Priority Data

Sep. 15, 2017   (JP) ................. 2017-177592

(51) Int. Cl.
| | |
|---|---|
| *B60R 19/18* | (2006.01) |
| *B62D 25/08* | (2006.01) |
| *B60R 19/02* | (2006.01) |
| *B62D 21/15* | (2006.01) |
| *B60R 19/34* | (2006.01) |

(52) U.S. Cl.
CPC ............ *B60R 19/18* (2013.01); *B60R 19/023* (2013.01); *B62D 21/152* (2013.01); *B62D 25/08* (2013.01); *B62D 25/082* (2013.01); *B60R 19/34* (2013.01)

(58) Field of Classification Search
CPC ..... B60R 19/18; B60R 19/023; B62D 21/152; B62D 25/08; B62D 25/082

USPC ............. 296/187.09; 293/102, 120, 121, 122
See application file for complete search history.

(56) References Cited

U.S. PATENT DOCUMENTS

| 8,936,276 B1 * | 1/2015 | Vyas ..................... B62D 25/082 |
| | | 180/232 |
| 2014/0070552 A1 | 3/2014 | Shimotsu |
| 2014/0097641 A1 * | 4/2014 | Hayano ................. B60L 15/007 |
| | | 296/187.09 |
| 2014/0217777 A1 * | 8/2014 | Tanaka ................... B62D 25/20 |
| | | 296/187.09 |
| 2015/0246651 A1 | 9/2015 | Muraji et al. |

FOREIGN PATENT DOCUMENTS

| DE | 10 2011 078 029 B3 | 10/2012 |
| JP | 08310444 | * 11/1996 |
| JP | 2005-297857 | 10/2005 |

(Continued)

*Primary Examiner* — Joseph D. Pape
(74) *Attorney, Agent, or Firm* — Oblon, McClelland, Maier & Neustadt, L.LP.

(57) ABSTRACT

A vehicle front structure includes: a bumper reinforcement; a power unit including a right device and a left device; a dash section located at a position rearward of the power unit; and a rearward supporting part provided between a dash section and the power unit. The bumper reinforcement includes a first breakage initiation point having a relatively lower bending strength than bending strengths of other portions of the bumper reinforcement. The position of the first breakage initiation point is set such that when a columnar object collides against the vicinity of the center in the vehicle width direction of the vehicle, the first breakage initiation point transfers a collision load to one of the right device and the left device which is supported by the rearward supporting part.

7 Claims, 5 Drawing Sheets

(56) References Cited

FOREIGN PATENT DOCUMENTS

| JP | 2007-290581 | 11/2007 |
| JP | 2014-54909 | 3/2014 |
| JP | 2015-147437 | 8/2015 |
| WO | 2014/042041 A1 | 3/2014 |
| WO | WO 2015/150656 A1 | 10/2015 |

\* cited by examiner

VEHICLE FRONT STRUCTURE

INCORPORATION BY REFERENCE

The disclosure of Japanese Patent Application No. 2017-177592 filed on Sep. 15, 2017 including the specification, drawings and abstract is incorporated herein by reference in its entirety.

BACKGROUND

1. Technical Field

The present disclosure relates to a vehicle front structure.

2. Description of Related Art

Japanese Patent Application Publication No. 2015-147437 discloses a structure in which a bulk (center bulk) is arranged at a center part in the vehicle width direction of a bumper reinforcement (hereinafter, referred to as bumper RF) in order to suppress a breakage in the bumper RF at the center part in the vehicle width direction at the time of a center pole collision (at the time of a collision of a columnar object against the vicinity of the center part in the vehicle width direction of a vehicle).

SUMMARY

Meanwhile, in the above technique, it can be considered that at the time of the center pole collision, the bumper RF might be broken at a position corresponding to either of a right end and a left end of the center bulk. However, the above technique is not directed to controlling at which of the right position and the left position the bumper RF should be broken.

However, a structure of a power unit located rearward of the bumper RF and a structure of a dash section located rearward of the power unit are not always arranged in a right-left symmetrical manner. Depending on the structures of the power unit and the dash section, by controlling the position breakage of the bumper RF, it might be possible to reduce amount of deformation of a vehicle cabin. Thus, in this point, the above technique still has room for improvement.

The present disclosure provides a vehicle front structure that controls a position where a bumper RF is broken at the time of a center pole collision so as to reduce amount of deformation of a vehicle cabin.

A first aspect of the disclosure provides a vehicle front structure including: a pair of right and left front side members extending in a vehicle longitudinal direction in a vehicle front part; a bumper reinforcement extending in a vehicle width direction and coupling front ends of the pair of right and left front side members; a power unit provided at a position between the pair of right and left front side members and rearward of the bumper reinforcement, the power unit being configured by coupling a right device included in a right part of the power unit and a left device included in a left part of the power unit to each other; a dash section located at a position rearward of the power unit and frontward of a vehicle cabin; and a rearward supporting part provided between the dash section and the power unit and configured to support the power unit when the power unit is moved in a vehicle rearward direction. The bumper reinforcement includes a first breakage initiation point at a position deviating from a center of the bumper reinforcement in the vehicle width direction, the first breakage initiation point having a relatively lower bending strength than bending strengths of other portions of the bumper reinforcement such that the first breakage initiation point initially becomes broken when a columnar object collides against a vicinity of the center in the vehicle width direction of the vehicle from a vehicle frontward direction, and the position of the first breakage initiation point is set such that when the columnar object collides against the vicinity of the center in the vehicle width direction of the vehicle, the first breakage initiation point transfers a collision load to a device supported by the rearward supporting part, the device corresponding to one of the right device and the left device.

Note that a rearward supporting part is a part that can generate reaction force relative to the power unit moved in a vehicle rearward direction. Hence, members (parts) such as piping and others which are easily deformable when receiving a collision load via the power unit do not correspond to the rearward supporting part.

In the vehicle front structure of the first aspect, a pair of the right and left front side members extends along a vehicle longitudinal direction in the vehicle front part. The bumper RF extends along the vehicle width direction so as to couple the front ends of the pair of right and left front side members. The power unit is arranged at a position between the pair of right and left front side members and also rearward of the bumper RF.

The power unit is configured by coupling a right device composing a right part and a left device composing a left part to each other. The rearward supporting part is provided in an area between the dash section and the power unit, and the power unit is supported by the rearward supporting part when the power unit is translated in the vehicle rearward direction.

The bumper RF has a first breakage initiation point at a position deviating from the center in the vehicle width direction. The first breakage initiation point is a portion to be initially broken in the bumper RF at the time of a center pole collision (at the time of a collision of a columnar object against the vicinity of the center part in the vehicle width direction of the vehicle).

Here, if the device that is supported by the rearward supporting part is the left device in the power unit, and the device to which the first breakage initiation point of the bumper RF transfers the collision load is the right device in the power unit (that is, the device supported by the rearward supporting part and the device to which the first breakage initiation point transfers the collision load are different from each other), a shear input at the coupled part between the left device and the right device becomes greater. Then, the coupling between the left device and the right device is released (in other words, a breakage in the power unit occurs), so that only the right device that receives the collision load from the first breakage initiation point is moved toward the vehicle cabin, and the load is thereby locally transferred to the dash section; consequently, amount of deformation of the dash section might be increased.

To cope with this, in the vehicle front structure, the position of the first breakage initiation point is set such that at the time of a center pole collision, the first breakage initiation point transfers the collision load to a device that is one of the right and left devices, the device being supported by the rearward supporting part. Accordingly, in this vehicle front structure, it is possible to easily realize a deformation mode described below at the time of the center pole collision.

That is, at the time of the center pole collision, the bumper RF is broken not at the center position in the vehicle width direction against which the center pole has collided, but at the first breakage initiation point located at a position deviating from the center in the vehicle width direction. Next, the first breakage initiation point of the bumper RF transfers the collision load to one of the right device and the left device in the power unit (depending on the position of the first breakage initiation point). When the power unit is moved in the vehicle rearward direction by the collision load, the power unit is supported by the rearward supporting part. In this case, in the vehicle front structure, it is configured that the position of the first breakage initiation point is properly set such that the first breakage initiation point transfers the collision load to the device of the right device and the left device at the time of a center pole collision, the device being supported by the rearward supporting part. That is, the device supported by the rearward supporting part and the device to which the first breakage initiation point transfers the collision load are the identical device; therefore, a shear input caused at the coupled part between the right device and the left device is not increased. As a result, a breakage in the power unit is suppressed.

In addition, since the breakage in the power unit is suppressed, a reaction force from the power unit to the bumper RF is increased at the first breakage initiation point. Accordingly, a breakage at a second point is likely to occur in the bumper RF. When the breakage at the second point occurs, the power unit is pushed toward the vehicle rearward direction within a range between the two breakage points in the bumper RF, to thereby distribute the collision load in the vehicle width direction. As a result, it is possible to reduce a local input relative to the dash section, to thereby suppress deformation of the vehicle cabin.

In the first aspect, the bumper reinforcement may include a second breakage initiation point at a position located opposite side of the center of the bumper reinforcement in the vehicle width direction from the first breakage initiation point, the second breakage initiation point having a bending strength that is lower than the bending strengths of the other portions of the bumper reinforcement and higher than a bending strength of the first breakage initiation point.

In the above configuration, the bumper RF has the second breakage initiation point having a bending strength that is lower than bending strengths of the other portions but higher than that of the first breakage initiation point, the second breakage initiation point located at the opposite position to the first breakage initiation point with respect to the center in the vehicle width direction. Hence, a breakage at the second point caused in the bumper RF is likely to occur at the position located opposite to the first breakage initiation point (the position of the second breakage initiation point) with respect to the center in the vehicle width direction. Therefore, compared with the deformation mode in which a breakage at the second point occurs at the center position in the vehicle width direction against which the center pole has collided, the power unit can be pushed toward the vehicle rearward direction within a wide range in the vehicle width direction of the bumper RF. Accordingly, it is possible to distribute the collision load in a wider range.

In the first aspect, a part of the power unit that is supported by the rearward supporting part when the power unit is moved in the vehicle rearward direction may be a rear end of the power unit in the vehicle longitudinal direction.

In the above configuration, the power unit is initially supported by the dash section at the rear end in the vehicle longitudinal direction of the power unit; therefore, it is possible to quickly support the power unit from the rearward side after occurrence of the center pole collision.

In the first aspect, the rearward supporting part may be a gear box.

In the above configuration, a gear box as the rearward supporting part can support the power unit from the vehicle rearward side.

In the first aspect, one of the right device and the left device may include a transaxle, and the other of the right device and the left device may include an engine.

The above configuration may suitably be applied to a vehicle including an engine and a transaxle.

A second aspect of the disclosure provides a vehicle front structure including: a pair of right and left front side members extending in a vehicle longitudinal direction in a vehicle front part; a bumper reinforcement extending in a vehicle width direction and coupling front ends of the pair of right and left front side members; a power unit provided at a position between the pair of right and left front side members and rearward of the bumper reinforcement, the power unit being configured by coupling a right device included in a right part of the power unit and a left device included in a left part of the power unit; a dash section located at a position rearward of the power unit and frontward of a vehicle cabin; and a rearward supporting part provided between the dash section and the power unit and configured to support the power unit when the power unit is moved in a vehicle rearward direction. The bumper reinforcement includes a first breakage initiation point having a relatively lower bending strength in the longitudinal direction of the bumper reinforcement, and the first breakage initiation point is provided at a position outwardly apart in the vehicle width direction from a center of the bumper reinforcement in the vehicle width direction, the position being located more outward in the vehicle width direction than the rearward supporting part.

Also in the vehicle front structure of the second aspect, at the time of the center pole collision, the deformation mode described below can easily be realized.

That is, at the time of the center pole collision, the bumper RF is broken not at the center position in the vehicle width direction against which the center pole has collided, but at the first breakage initiation point located at a position deviating from the center in the vehicle width direction. Next, the first breakage initiation point of the bumper RF transfers the collision load to one of the right device and the left device in the power unit (depending on the position of the first breakage initiation point). When the power unit is moved in the vehicle rearward direction by the collision load, the power unit is supported by the rearward supporting part. In this case, in the vehicle front structure, it is configured that the position of the first breakage initiation point is properly set such that the first breakage initiation point transfers the collision load to the device of the right device and the left device at the time of a center pole collision, the device being supported by the rearward supporting part. That is, the device supported by the rearward supporting part and the device to which the first breakage initiation point transfers the collision load are the identical device; therefore, a shear input caused at the coupled part between the right device and the left device is not increased. As a result, a breakage in the power unit is suppressed.

In addition, since the breakage in the power unit is suppressed, a reaction force from the power unit to the bumper RF is increased at the first breakage initiation point. Accordingly, a breakage at the second point is likely to occur in the bumper RF. When the breakage at the second point occurs, the power unit is pushed toward the vehicle rearward direction within a range between the two breakage points in the bumper RF, to thereby distribute the collision load in the vehicle width direction. As a result, it is possible to reduce a local input relative to the dash section, to thereby suppress deformation of the vehicle cabin.

In the second aspect, the bumper reinforcement may have a second breakage initiation point at a position located opposite side of the center of the bumper reinforcement in the vehicle width direction from the first breakage initiation point, the second breakage initiation point having a bending strength that is lower than bending strengths of the other portions of the bumper reinforcement and higher than the bending strength of the first breakage initiation point.

In the above configuration of the vehicle front structure, the bumper RF has the second breakage initiation point at the opposite position to the first breakage initiation point with respect to the center in the vehicle width direction. Hence, a breakage at the second point caused in the bumper RF is likely to occur at the position located opposite to the first breakage initiation point (the position of the second breakage initiation point) with respect to the center in the vehicle width direction. Therefore, compared with the deformation mode in which a breakage at the second point occurs at the center position in the vehicle width direction against which the center pole has collided, the power unit can be pushed toward the vehicle rearward direction within a wide range in the vehicle width direction of the bumper RF. Accordingly, it is possible to distribute the collision load in a wider range.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, with reference to FIG. 1A to FIG. 1D, the first embodiment of the present disclosure will be described.

An arrow FR and an arrow LH appropriately indicated in each drawing denote a vehicle frontward direction and a vehicle leftward direction, respectively. In the present embodiment, the vehicle leftward direction denotes a left side when the vehicle frontward direction is defined to be a front side. In the following description, when a front-rear direction and a right-left direction are used unless otherwise mentioned, the front-rear direction denotes a vehicle longitudinal direction, and the right-left direction denotes a vehicle width direction, respectively.

Figure 1A:
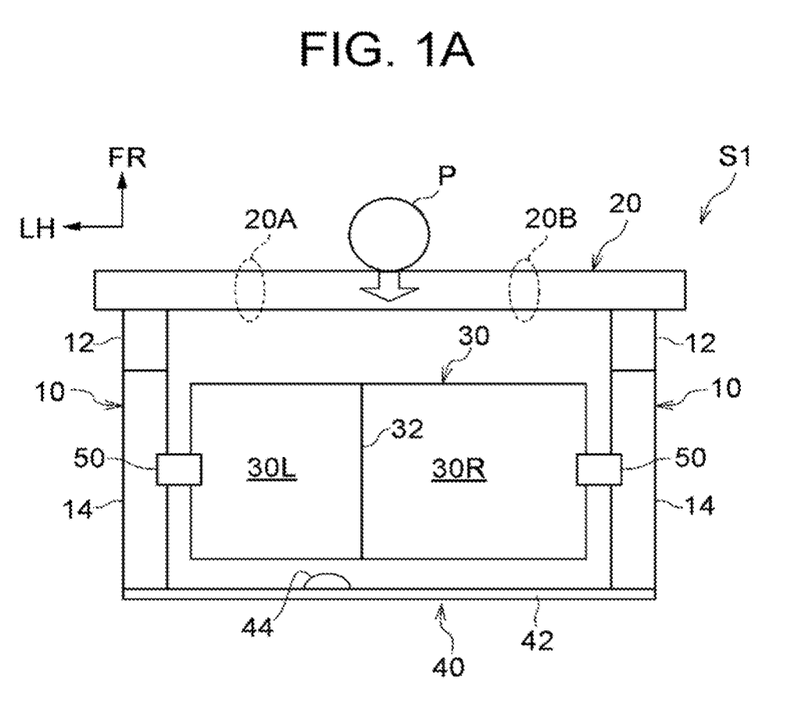
FIG. 1A is a schematic plan view showing a vehicle front structure of a first embodiment.

As shown in FIG. 1A, a vehicle front structure S1 of the first embodiment includes a pair of right and left front side members 10. The front side members 10 are vehicle body frame members with their longitudinal lengths extending along the vehicle longitudinal direction, and are arranged to be right-left symmetric with respect to a center line of the vehicle width direction of the vehicle.

A front end of each front side member 10 is formed as a deformation part 12. The deformation part 12 has a smaller strength against a load in the vehicle longitudinal direction than that of a main body 14 (a part of the front side member 10 other than the deformation part 12). As the deformation part 12, a crash box made of aluminum or a fiber reinforcement plastic may be exemplified, for example.

The vehicle front structure S1 includes a bumper RF 20. The bumper RF 20 is a vehicle body frame member extending in the vehicle width direction so as to couple the respective front ends of a pair of the right and left front side members 10. Specifically, the front ends of the deformation parts 12 of the pair of right and left front side members 10 are combined to a rear surface of the bumper RF 20. Although it is schematically illustrated that the bumper RF 20 straightly extends in the vehicle width direction, the bumper RF 20 may be formed in a shape such that its both sides in the vehicle width direction are bent toward the vehicle rearward direction, that is, formed in a bow-like shape projecting in the vehicle frontward direction as a whole. A more detailed configuration of the bumper RF 20 will be described later.

The vehicle front structure S1 includes a power unit 30 disposed at a position between the pair of front side members 10 and also rearward of the bumper RF 20. The power unit 30 is configured by coupling a transaxle 30L as a "left device" and an engine 30R as a "right device" to each other. The power unit 30 is supported by the main bodies 14 of the pair of right and left front side members 10 via right and left engine mounts 50. Although not illustrated, the power unit 30 is also supported at a part of the transaxle 30L from below in the vehicle vertical direction. A width dimension of the engine 30R is greater than the width dimension of the transaxle 30L, and a coupled part 32 is disposed at a position deviating leftward from the center in the vehicle width direction.

The vehicle front structure S1 includes a dash section 40. The dash section 40 is a part that partitions a space (an engine compartment) where the power unit 30 is disposed and the vehicle cabin from each other. That is, the dash section 40 configures a front end of the vehicle cabin. The dash section 40 includes a dash panel 42 and a not-illustrated dash cross. Respective rear ends of the pair of right and left front side members 10 are coupled to the dash panel 42. A gear box 44 is provided in front of the dash panel 42 in such a manner as to project from the dash panel 42 in the vehicle frontward direction. Hence, in the present embodiment, it is structured that if the power unit 30 is translated in the vehicle rearward direction, the gear box 44 supports the power unit 30. That is, in the present embodiment, the gear box 44 corresponds to a "rearward supporting part" of the present disclosure. The gear box 44 is disposed at a position deviating leftward from the center in the vehicle width direction and also rearward of the transaxle 30L.

Next, a detailed configuration of the bumper RF 20 will be described.

The bumper RF 20 has a first breakage initiation point 20A at a position deviating (at a position deviating leftward in the present embodiment) from the center in the vehicle width direction. The first breakage initiation point 20A is a portion of the bumper RF 20 to be initially broken at the time of a center pole collision. That is, normally, when a center pole collision occurs, the bumper RF 20 is likely to be broken at a center position in the vehicle width direction into which a load is directly input from a pole P. However, the bumper RF 20 of the present embodiment is configured such that by setting a bending strength properly depending on the position in the vehicle width direction, a portion to be initially broken at the time of a center pole collision is set at a position deviating from the center in the vehicle width direction (a position of the first breakage initiation point 20A) (see FIG. 1B).

The bumper RF 20 has a second breakage initiation point 20B at a position located opposite to the first breakage initiation point 20A with respect to the center in the vehicle width direction. The second breakage initiation point 20B is a portion set to be broken subsequently to the first breakage initiation point 20A at the time of the center pole collision. The second breakage initiation point 20B is disposed to be symmetric to the first breakage initiation point 20A with respect to the center in the vehicle width direction.

The description will differently be provided, the bumper RF 20 has two breakage initiation points (the first breakage initiation point 20A and the second breakage initiation point 20B) with the center in the vehicle width direction interposed therebetween. The bending strength of the first breakage initiation point 20A is set to be lower than the bending strength of the second breakage initiation point 20B. With this setting, it is controlled that the bumper RF 20 is initially broken at the first breakage initiation point 20A at the time of a center pole collision, and the bumper RF 20 is broken at the second breakage initiation point 20B subsequently to the first breakage initiation point 20A.

One example of the above-described structure of the bumper RF 20 (the bumper RF 20 having the bending strength set depending on the position in the vehicle width direction) will be described with reference to FIG. 3.

Figure 3:
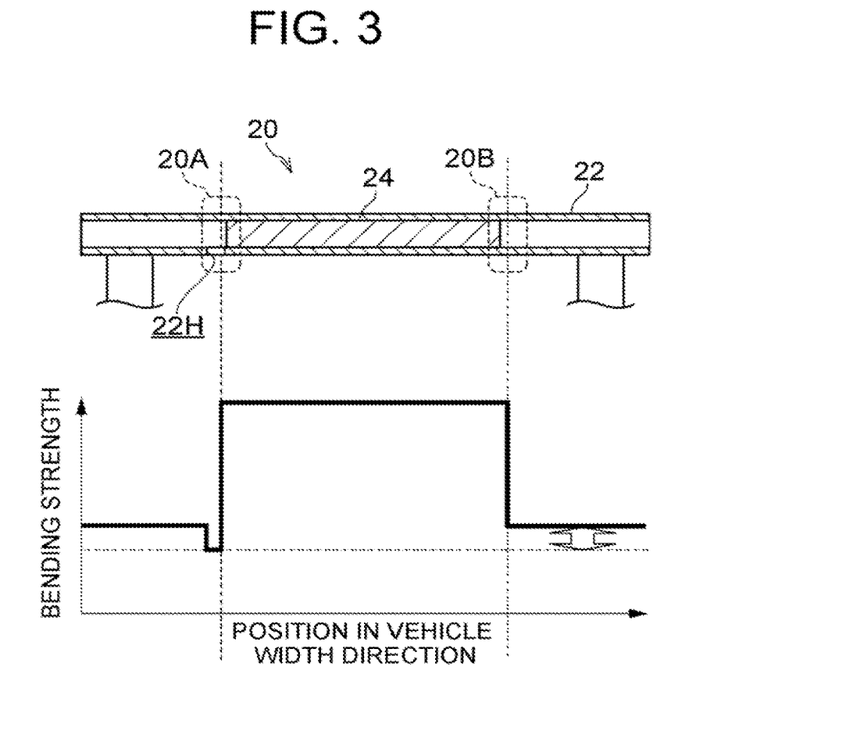
FIG. 3 is a view showing an example of the structure of the bumper RF and bending strengths at respective positions of the bumper RF.

The bumper RF 20 shown in FIG. 3 is configured to have a closed sectional structure, and include a bumper RF main body 22 extending along the vehicle width direction, and a bulk member 24 disposed inside the bumper RF main body 22. The bulk member 24 is set within a predetermined range (range extending in the vehicle width direction) at the center in the vehicle width direction of the bumper RF main body 22. In addition, a hole 22H is formed at a position corresponding to a position immediately leftward of the bulk member 24 in the bumper RF main body 22, and thus the bending strength of the bumper RF 20 is set to be locally lowered at a position in the vehicle width direction corresponding to the hole 22H.

FIG. 3 shows a graph showing the bending strength of the bumper RF 20 depending on the position in the vehicle width direction. As shown in FIG. 3, the bending strength of the bumper RF 20 is higher within a range where the bulk member 24 is disposed (a certain range at the center in the vehicle width direction), and is lower within a range where the bulk member 24 is not disposed (in the vicinities of both ends in the vehicle width direction). The bending strength becomes locally further lower in the portion of the bumper RF 20 where the hole 22H is formed.

By employing the above structure, the portion of the bumper RF 20 corresponding to the position in the vehicle width direction of the hole 22H can be set to be the first breakage initiation point 20A, and the portion of the bumper RF 20 corresponding to the right end of the bulk member 24 can be set to be the second breakage initiation point 20B. Note that the first breakage initiation point 20A and the second breakage initiation point 20B are not limited to the above structure. The first breakage initiation point 20A and the second breakage initiation point 20B may be formed by using various means other than the above structure, such as forming a cutout in the bumper RF main body 22 to set a relative difference in bending strength, for example.

Operation and Effect

Next, operation and effect of the present embodiment will be described.

In the present embodiment, the pair of right and left front side members 10 extend along the vehicle longitudinal direction in the front part of the vehicle. The bumper RF 20 extends in the vehicle width direction so as to couple the front ends of the pair of right and left front side members 10. In addition, the power unit 30 is disposed between the pair of right and left front side members 10 and also rearward of the bumper RF 20.

The power unit 30 is configured by coupling the engine 30R composing the right part and the transaxle 30L composing the left part to each other. Since the gear box 44 is provided in an area between the dash section 40 and the power unit 30, the power unit 30 is first supported by the gear box 44 if the power unit 30 is translated in the vehicle rearward direction.

The bumper RF 20 has the first breakage initiation point 20A to be initially broken at the time of the center pole collision, at a position deviating from the center in the vehicle width direction.

Figure 1B:
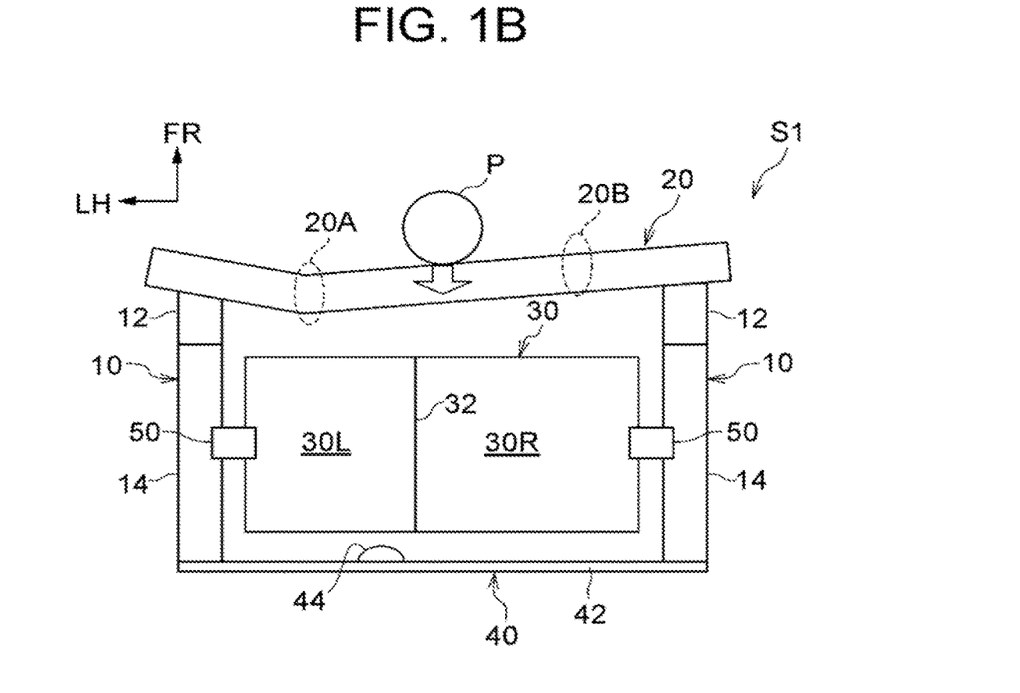
FIG. 1B is a schematic plan view showing a moment when a center pole collision occurs, and a bumper RF is broken at a first breakage initiation point in the vehicle front structure of the first embodiment.
Figure 1C:
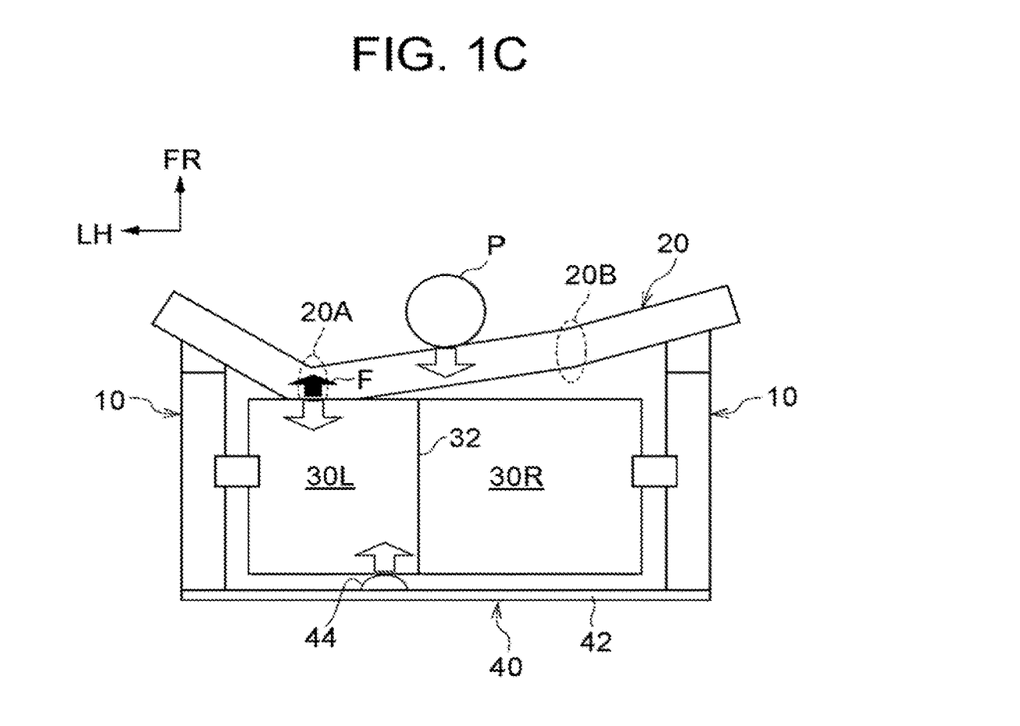
FIG. 1C is a schematic plan view showing a moment when the bumper RF is broken at a second breakage initiation point in the vehicle front structure of the first embodiment.

Accordingly, in the vehicle front structure S1 of the present embodiment, as shown in FIG. 1A to FIG. 1C, the position of the first breakage initiation point 20A is set such that the first breakage initiation point 20A transfers a collision load to a device that is one of the engine 30R and the transaxle 30L, which is supported by the gear box 44 at the time of a center pole collision. Accordingly, in the vehicle front structure S1 of the present embodiment, it is possible to easily realize a deformation mode described below at the time of the center pole collision.

Specifically, at the time of the center pole collision, as shown in FIG. 1B, the bumper RF 20 is broken not at the center position in the vehicle width direction against which the pole has collided, but at the first breakage initiation point 20A located at a position deviating (position deviating leftward in the present embodiment) from the center in the vehicle width direction. Next, as shown in FIG. 1C, the first breakage initiation point 20A of the bumper RF 20 transfers the collision load to the transaxle 30L, which corresponds to one of the engine 30R and the transaxle 30L included in the power unit 30. When the power unit 30 is moved to the vehicle rearward direction by the collision load, the power unit 30 (the transaxle 30L) is supported by the gear box 44. In this case, the device (the transaxle 30L) supported by the gear box 44 and the device (the transaxle 30L) to which the first breakage initiation point 20A transfers the collision load are an identical device; therefore, a shear input caused at the coupled part 32 between the engine 30R and the transaxle 30L is not increased. As a result, a breakage in the power unit is suppressed.

Figure 1D:
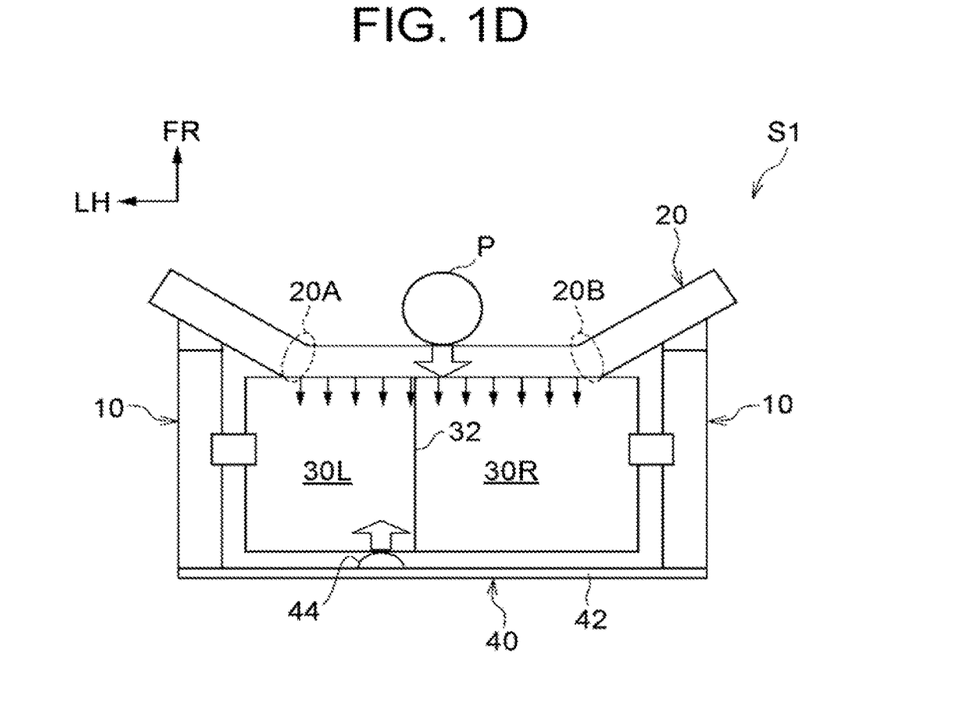
FIG. 1D is a schematic plan view showing a state in which the bumper RF surface-pushes a power unit in the vehicle front structure of the first embodiment.

In addition, since the breakage in the power unit is suppressed, a reaction force from the power unit 30 to the bumper RF 20 is increased at the first breakage initiation point 20A (see an arrow F in FIG. 1C). Accordingly, as shown in FIG. 1C, a breakage at the second point is likely to occur in the bumper RF 20. When the breakage at the second point occurs, as shown in FIG. 1D, the power unit 30 is pushed (surface-pushed) toward the vehicle rearward direction within a range between the two breakage points in the bumper RF 20, to thereby distribute the collision load in the vehicle width direction. As a result, it is possible to suppress a local input relative to the dash section 40, to thus suppress deformation of the vehicle cabin.

In the present embodiment, the bumper RF 20 has the second breakage initiation point 20B having a bending strength that is lower than bending strengths of the other portions but higher than the bending strength of the first breakage initiation point 20A, the second breakage initiation point 20B disposed at a position located opposite to the first breakage initiation point 20A with respect to the center in the vehicle width direction. Hence, as shown in FIG. 1C, a breakage at the second point caused in the bumper RF 20 is likely to occur at a position located opposite to the first breakage initiation point 20A (i.e. the position of the second breakage initiation point 20B) with respect to the center of the vehicle width direction. Hence, compared with the deformation mode in which a breakage at the second point occurs at the center position in the vehicle width direction against which the pole P has collided, it is possible to push the power unit 30 toward the vehicle rearward direction in a wide range in the vehicle width direction of the bumper RF 20, as shown in FIG. 1D, to thereby distribute the collision load in a wider range.

Although simplified in the drawings, the power unit 30 has a rear surface in a recess-projection shape. In the present embodiment, of the rear surface in a recess-projection shape, a portion located at the rearmost end in the vehicle longitudinal direction faces the gear box 44 in the vehicle longitudinal direction. This means that the rear end in the vehicle longitudinal direction of the power unit 30 is first supported by the dash section 40. Accordingly, after the center pole collision occurs, the power unit 30 can quickly be supported from the rearward direction.

Although the description is omitted for convenience, a not-illustrated cooling unit and others are usually disposed between the bumper RF 20 and the power unit 30. Hence, when the center pole collision occurs, the bumper RF 20 becomes broken at the first breakage initiation point 20A, and the bumper RF 20 is then displaced toward the power unit 30, the collision load is thus transferred from the bumper RF 20 via the cooling unit and others to the power unit 30.

Second Embodiment

Next, with reference to FIG. 2A to FIG. 2C, the second embodiment of the present disclosure will be described. Note that the same configurations as those of the first embodiment will be denoted by the same reference numerals in the drawings, description thereof will be omitted, and only different configurations will be described.

Figure 2A:
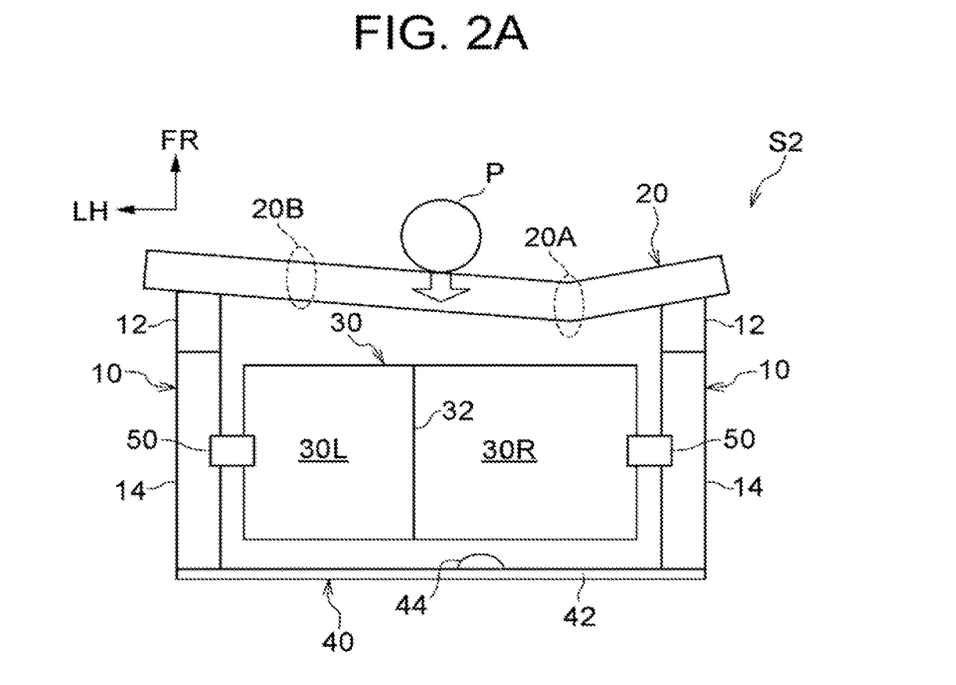
FIG. 2A is a schematic plan view showing a moment when the bumper RF is broken at the first breakage initiation point in a vehicle front structure of the second embodiment.

As shown in FIG. 2A, in a vehicle front structure S2 of the second embodiment, different from the vehicle front structure S1 of the first embodiment, the gear box 44 is disposed at a position deviating rightward from the center in the vehicle width direction and also rearward of the engine 30R.

In addition, different from that of the first embodiment, the first breakage initiation point 20A of the bumper RF 20 is provided at a position deviating rightward from the center in the vehicle width direction. The second breakage initiation point 20B of the bumper RF 20 is provided at a position deviating leftward from the center in the vehicle width direction. That is, in the bumper RF 20 of the second embodiment, the arrangement of the first breakage initiation point 20A and the second breakage initiation point 20B is inverse to the arrangement thereof in the first embodiment. With this configuration, as shown in FIG. 2A, it is configured to initially cause a breakage at a position deviating rightward from the center in the vehicle width direction of the bumper RF 20 at the time of the center pole collision.

Operation and Effect

Also in the vehicle front structure S2 of the second embodiment, it is possible to easily realize the same deformation mode as the deformation mode of the first embodiment, that is, the deformation mode as described below. That is, at the time of a center pole collision, as shown in FIG. 2A, the bumper RF 20 is broken not at the center position in the vehicle width direction against which the pole has collided, but at the first breakage initiation point 20A located at a position deviating (position deviating rightward in the present embodiment) from the center in the vehicle width direction. Next, as shown in FIG. 2B, the first breakage initiation point 20A of the bumper RF 20 transfers the collision load to the engine 30R, which corresponds to one of the engine 30R and the transaxle 30L included in the power unit 30. When the power unit 30 is moved in the vehicle rearward direction due to the collision load, the power unit 30 (the engine 30R) is supported by the gear box 44. In this case, the device (the engine 30R) supported by the gear box 44 and the device (the engine 30R) to which the first breakage initiation point 20A transfers the collision load are an identical device; therefore, a shear input caused at the coupled part 32 between the engine 30R and the transaxle 30L is not increased. As a result, a breakage in the power unit is suppressed.

Figure 2B:
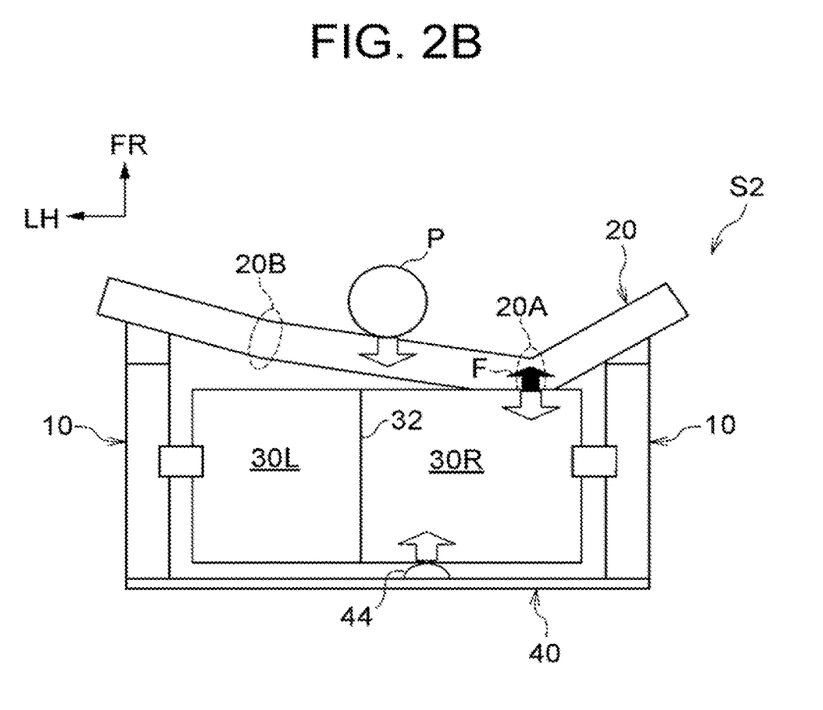
FIG. 2B is a schematic plan view showing a moment when the bumper RF is broken at the second breakage initiation point in the vehicle front structure of the second embodiment.
Figure 2C:
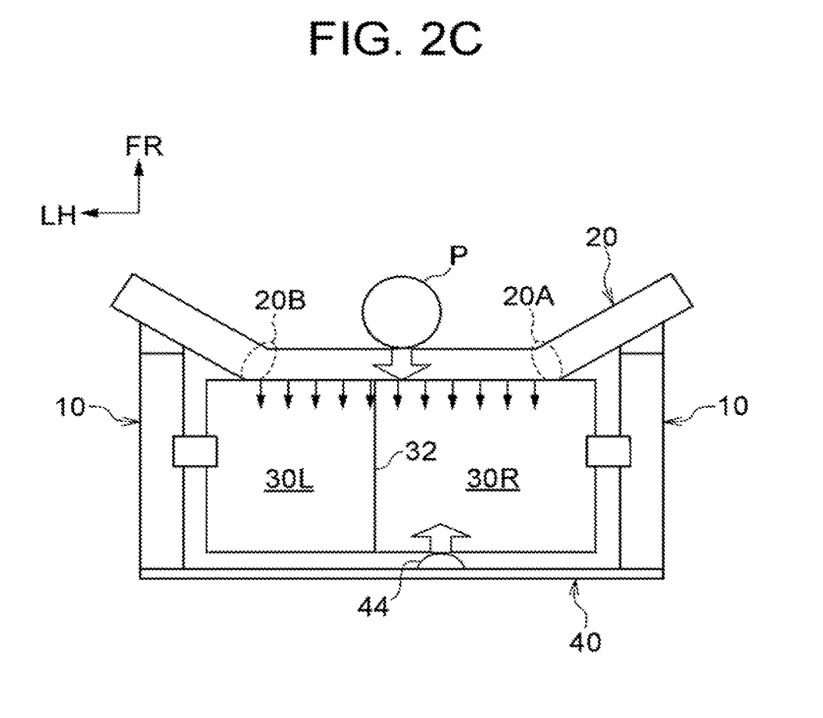
FIG. 2C is a schematic plan view showing a state in which the bumper RF surface-pushes the power unit in the vehicle front structure of the second embodiment.

Furthermore, since the breakage in the power unit is suppressed, a reaction force from the power unit 30 to the bumper RF 20 is increased at the first breakage initiation point 20A (see an arrow F in FIG. 2B). Accordingly, as shown in FIG. 2B, a breakage at the second point is likely to occur in the bumper RF 20. When the breakage at the second point occurs, as shown in FIG. 2C, the power unit 30 is pushed (surface-pushed) toward the vehicle rearward direction within a range between the two breakage points in the bumper RF 20, to thereby distribute the collision load in the vehicle width direction. As a result, it is possible to reduce a local input relative to the dash section 40, to thus suppress deformation of the vehicle cabin.

Supplemental Description of the above Embodiments

Figure 4:
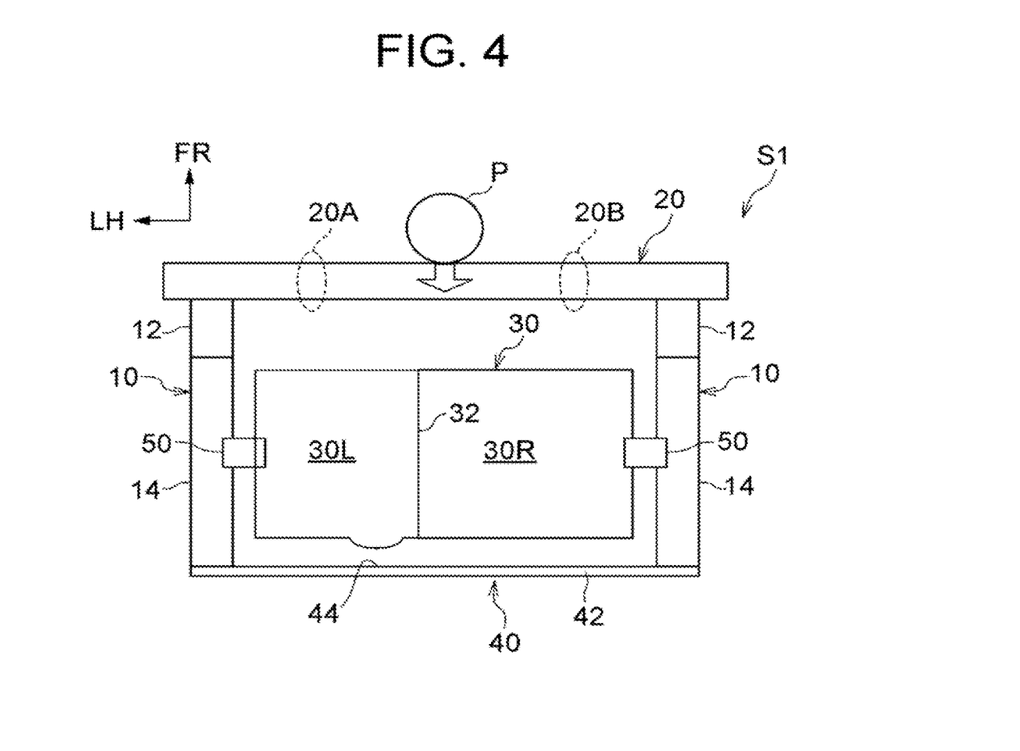
FIG. 4 is a schematic plan view showing a variation of the first embodiment.

In the above embodiments, it has been exemplified that the gear box 44 projects in the vehicle frontward direction from the dash panel 42 that is a major part of the dash section 40, and also functions as a "rearward supporting part", but the present disclosure is not limited to this example. For example, as shown in FIG. 4, it may be configured that a part of the power unit 30 projects rearward, and this projecting part is first supported by, for example, the dash panel 42 in the dash section 40 (in this case, a part of the dash panel 42 corresponds to the "rearward supporting part"). Also in this case (also in the case in which the part of the dash section is the rearward supporting part), the rearward supporting part is provided in an area between the dash section and the power unit.

In the above embodiments, it has been exemplified that the gear box 44 as the "rearward supporting part" is provided at a position deviating outward in the vehicle width direction from the center in the vehicle width direction, but the present disclosure is not limited to this example. For example, the rearward supporting part may be located at the center in the vehicle width direction. In this case, supposing the configuration of the power unit 30 of the above embodiments, the rearward supporting part supports the engine 30R (the right device). Hence, the configuration of the bumper RF 20 is required to be the configuration of the second embodiment (i.e. the configuration of providing the first breakage initiation point 20A on the right side).

The "rearward supporting part" of the present disclosure is not limited to the gear box 44. For example, the "rearward supporting part" may be a master cylinder, or the dash panel 42 that is a general part of the dash section 40, or a dash cross that is a frame member coupling front ends of a pair of right and left rockers (frame members extending in the vehicle longitudinal direction between both ends in the vehicle width direction in the lower part of the vehicle body) to each other. The rearward supporting part is a part (member) that can generate a reaction force relative to the power unit. Hence, parts (members) that are easily deformable when receiving a collision load via the power unit, such as piping and brackets, do not correspond to the rearward supporting part.

In addition, in the above embodiments, it has been exemplified that the second breakage initiation point 20B and the first breakage initiation point 20A are arranged at symmetric positions with respect to the center in the vehicle width direction, but the present disclosure is not limited to this. The second breakage initiation point 20B may be provided at least at a position located opposite to the first breakage initiation point 20A with respect to the center in the vehicle width direction.

In the above embodiments, it has been exemplified that the bumper RF 20 has the first breakage initiation point 20A and the second breakage initiation point 20B, but the present disclosure is not limited to this example. The bumper RF may not have the second breakage initiation point 20B. Also in this case (having no second breakage initiation point 20B), the device that applies a reaction force (the arrow F in FIG. 1C and FIG. 2B) to the first breakage initiation point 20A of the bumper RF 20 is supported by the rearward supporting part (the gear box 44), to thereby easily cause a breakage at the second point in the bumper RF 20. By causing the breakage at the second point, it is possible to surface-push the power unit 30 and the dash section 40; accordingly, it is possible to suppress deformation of the vehicle cabin.

In the above embodiments, as shown in FIG. 1A, it has been exemplified that the first breakage initiation point 20A is provided at a position more outward in the vehicle width direction than the "rearward supporting part" (the gear box 44), but the present disclosure is not limited to this example. The first breakage initiation point 20A may be set at a position more inward in the vehicle width direction than the rearward supporting part.

What is claimed is:

1. A vehicle front structure comprising:
   a pair of right and left front side members extending in a vehicle longitudinal direction in a vehicle front part;
   a bumper reinforcement extending in a vehicle width direction and coupling front ends of the pair of right and left front side members;
   a power unit provided at a position between the pair of right and left front side members and rearward of the bumper reinforcement, the power unit being configured by coupling a right device included in a right part of the power unit and a left device included in a left part of the power unit to each other;
   a dash section located at a position rearward of the power unit and frontward of a vehicle cabin; and
   a rearward supporting part provided between the dash section and the power unit and configured to support the power unit when the power unit is moved in a vehicle rearward direction, wherein
   the bumper reinforcement includes a first breakage initiation point at a position deviating from a center of the bumper reinforcement in the vehicle width direction, the first breakage initiation point having a relatively lower bending strength than bending strengths of other portions of the bumper reinforcement such that the first breakage initiation point initially becomes broken when a columnar object collides against a vicinity of the center in the vehicle width direction of the vehicle from a vehicle frontward direction,
   the bumper reinforcement includes a second breakage initiation point at a position deviating from the center of the bumper reinforcement in the vehicle width direction located on an a side of the bumper reinforcement opposite to the first breakage initiation portion, the second breakage initiation point having a bending strength that is lower than the bending strengths of the other portions of the bumper reinforcement and higher than a bending strength of the first breakage initiation point, and
   the position of the first breakage initiation point is set such that when the columnar object collides against the vicinity of the center in the vehicle width direction of the vehicle, the first breakage initiation point transfers a collision load to a device supported by the rearward supporting part, the device corresponding to one of the right device and the left device.

2. The vehicle front structure according to claim 1, wherein
   a part of the power unit that is supported by the rearward supporting part when the power unit is moved in the vehicle rearward direction is a rear end of the power unit in the vehicle longitudinal direction.

3. The vehicle front structure according to claim 1, wherein
   the rearward supporting part is a gear box.

4. The vehicle front structure according to claim 1, wherein
   one of the right device and the left device includes a transaxle, and the other of the right device and the left device includes an engine.

5. A vehicle front structure comprising:
   a pair of right and left front side members extending in a vehicle longitudinal direction in a vehicle front part;
   a bumper reinforcement extending in a vehicle width direction and coupling front ends of the pair of right and left front side members;
   a power unit provided at a position between the pair of right and left front side members and rearward of the bumper reinforcement, the power unit being configured by coupling a right device included in a right part of the power unit and a left device included in a left part of the power unit;
   a dash section located at a position rearward of the power unit and frontward of a vehicle cabin; and a rearward supporting part provided between the dash section and the power unit and configured to support the power unit when the power unit is moved in a vehicle rearward direction, wherein the bumper reinforcement includes a first breakage initiation point having a relatively lower bending strength in the longitudinal direction of the bumper reinforcement, the first breakage initiation point is provided at a position outwardly apart in the vehicle width direction from a center of the bumper reinforcement in the vehicle width direction, the position being located more outward in the vehicle width direction than the rearward supporting part, and the bumper reinforcement includes a second breakage initiation point located on an a side of the bumper reinforcement opposite to the first breakage initiation portion, the second breakage initiation point having a bending strength that is lower than the bending strengths of the other portions of the bumper reinforcement and higher than a bending strength of the first breakage initiation point.

6. The vehicle front structure according to claim 1, wherein rear ends of the pair of right and left front side members are coupled to the dash section, and the rearward supporting part extends from a front surface of the dash section.

7. The vehicle front structure according to claim 6, wherein side portions of the pair of right and left front side members are coupled to the power unit.

* * * * *